Dec. 14, 1937.                L. KANDARIAN                2,102,320
                         BEARING OBSTRUCTION EJECTOR
                             Filed Sept. 9, 1936
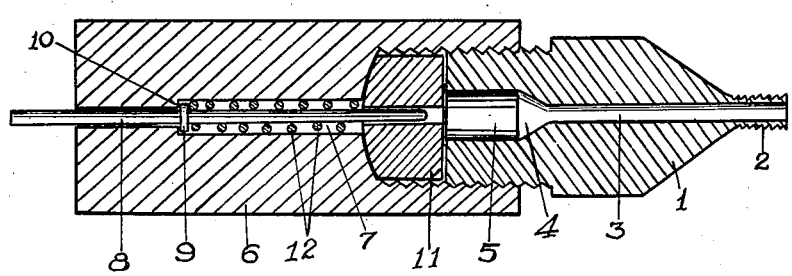
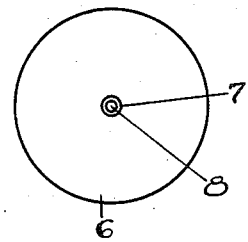
INVENTOR
Leon Kandarian
BY J. E. Trabucco
ATTORNEY Patented Dec. 14, 1937

2,102,320

UNITED STATES PATENT OFFICE 2,102,320

BEARING OBSTRUCTION EJECTOR

Leon Kandarian, Oakland, Calif.

Application September 9, 1936, Serial No. 99,976

3 Claims. (Cl. 184—105)

This invention relates to improvements in devices for dislodging obstructions from bearings or other members.

It frequently happens that hardened grease in the journal bearings of automobiles or machines prevents the injection of lubricating material. The ordinary high pressure lubricating pumps or other known devices now commonly used in many instances are incapable of loosening the hardened grease, thereby necessitating the use of means capable of exerting an extremely high pressure upon the hardened grease to effect its removal. My invention has for its primary object the provision of a device employing a blank cartridge for creating an explosive charge, which when directed into a journal bearing exerts such a sudden and extremely high pressure upon the hardened grease that it is effectively dislodged.

Other and further objects of my invention will be pointed out hereinafter, indicated in the appended claims, or obvious to one skilled in the art upon an understanding of the present disclosure. For the purposes of this application I have elected to show herein certain forms and details of a device for removing obstructions from bearings representative of my invention; it is understood, however, that the embodiment of my invention herein shown and described is for the purpose of illustration only, and that therefore it is not to be regarded as exhaustive of the variations of the invention, nor is it to be given any interpretation such as might have the effect of limiting the claims, short of the true and most comprehensive scope of the invention in the art.

In the accompanying drawing:

Fig. 1 is a longitudinal sectional view of my improved device for dislodging obstructions in bearings; and Fig. 2 is an end view of the same.

Referring to the drawing, the numeral 1 designates a tubular member made from steel or other suitable material, having a threaded nipple 2 at one end which is adapted to screw into a threaded opening ordinarily provided in a bearing or member for receiving a fitting for the attachment of a grease gun. A part of the member 1 and the nipple 2 are provided with a small axial bore 3 that communicates with an enlarged central bore 4 in the said member within which a blank cartridge 5 of suitable caliber is adapted to snugly fit.

The end of the tubular member 1 opposite the nipple 2 is reduced in size and externally threaded to engage with the internally threaded end of a tubular firing pin holding member 6. The member 6 is provided with a small axial bore 7 within which is movably positioned an elongated firing pin 8. The firing pin is provided with a circular flange 9 that normally engages with a shoulder 10 located in the bore 7, thereby providing means for preventing the pin from falling out of the said bore. Removably positioned in the threaded opening of the tubular member 6 is a block 11 which is so disposed that one end engages with a seat provided in the said member 6 and its opposite end engages with the rim or butt of the cartridge 5. The block 11 when the members 1 and 6 are screwed together firmly, engages with the butt end of the cartridge 5, thereby preventing its retraction when it is fired. The block 11 is also provided with an axial bore which is aligned with the opening 7 of the member 6, and the firing pin 8 also movably extends therein. A spiral spring 12 encircling the firing pin 8 engages at its ends with the circular flange 9 of the said pin and with the block 11. The spring yieldably maintains the firing pin 8 in a position whereby the inwardly disposed end thereof is spaced slightly from the cartridge. It also returns the firing pin automatically to this position after it is actuated by the impact of a hammer or other implement into engagement with the said cartridge. The firing pin 8 projects outwardly beyond the end of the member 6.

When the device is to be used to loosen the hardened grease in a bearing equipped with a fitting such as that with which pressure pumps or guns are used, the said fitting is unscrewed and supplanted by the nipple 2. With the cartridge 5 positioned in the bore 4, the outwardly projecting end of the firing pin 8 is struck a sharp blow with a hammer or other implement, thereby causing its inwardly disposed end to strike the cartridge and cause its discharge. The explosion causes air and gases of combustion to be directed with a sudden and extremely high pressure into the bearing, thereby causing the obstructing grease or dirt to become dislodged.

The unscrewing of the members 1 and 6 permits the replacement of the discharged cartridge with one which has not yet been fired. The spiral spring 10 automatically returns the firing pin 8 to a retracted position, primed to effect a succeeding discharge.

While I have shown the outer surface of the members 1 and 6 as being provided with knurled portions for the convenient screwing and unscrewing of these parts of the device, it is of course to be understood that any other suitable means may be used for this purpose.

Having described my invention, what I claim is:

1. A bearing obstruction ejector comprising an elongated member having means at one end for attachment to a structure which is to be freed of an obstruction, the said member and the said means having a longitudinal opening therethrough, the portion of the opening located in the means being restricted and another portion of the opening being enlarged to provide a seat for a cartridge; a tubular member removably secured to the elongated member; a block removably positioned in the tubular member for engaging with the butt end of a cartridge, which is positioned in the seat in the elongated member, whereby the cartridge is prevented from moving rearwardly when fired; a firing pin movably extending through the tubular member and the block, having one end projecting to a point outside the tubular member and its other end normally positioned adjacent the butt end of the cartridge; and spring means for moving the firing pin to its normal position after it is actuated against the butt end of the cartridge.

2. A bearing obstruction ejector comprising an elongated member having a threaded nipple at one end for attachment to a structure which is to be freed of an obstruction, the said member having a longitudinal bore therein, one end of which bore is restricted and communicates with the opening in the nipple and the other end of which is enlarged to provide a seat for a blank cartridge; a tubular member secured to the elongated member having a longitudinal opening therethrough, one end of said opening being enlarged; a block removably positioned in the enlarged part of the opening in the tubular member, the said block being positioned with one end in engagement with the butt end of the cartridge, whereby upon the firing of the cartridge it is prevented from becoming unseated, the said block having a longitudinal opening therethrough which is aligned with the longitudinal opening of the tubular member; a firing pin located in the aligned openings of the tubular member and the block, one end being located outside the tubular member; means for preventing the pin from falling from the aligned openings; and spring means yieldably holding the pin in a position whereby its inwardly disposed end does not engage with the cartridge.

3. A bearing obstruction ejector comprising an elongated member having a threaded male tubular fitting at one end for attachment to a structure which is to be freed of an obstruction, the said member having a longitudinal bore therein, one end of which bore is restricted and communicates with the opening in the fitting and the other end of which is enlarged to provide a seat for a blank cartridge; a tubular member secured to the elongated member having a longitudinal opening therethrough, one end of said opening being enlarged; a block removably positioned in the enlarged part of the opening in the tubular member, the said block being positioned with one end in engagement with the butt end of a cartridge positioned in the elongated member, whereby upon the firing of the cartridge it is prevented from becoming unseated, the said block having a longitudinal opening therethrough which is aligned with the longitudinal opening of the tubular member; a firing pin located in the aligned openings of the block and the tubular member, one end of which projects outside the tubular member and the other end is normally positioned in spaced relation to the butt end of the cartridge; and means for returning the pin to its normal position after it is actuated to a firing position against the cartridge.

LEON KANDARIAN.